United States Patent [19]

Iwane et al.

[11] Patent Number: 5,549,992

[45] Date of Patent: Aug. 27, 1996

[54] PREPARING METHOD FOR A NICKEL HYDROXIDE FOR A NICKEL ELECTRODE, A MANUFACTURING METHOD FOR THE NICKEL ELECTRODE, AND AN ALKALINE SECONDARY BATTERY INCORPORATING THE NICKEL ELECTRODE THEREIN

[75] Inventors: Noriyasu Iwane, Tokyo; Harauo Sawa, Yokohama, both of Japan

[73] Assignee: Furukawa Denchi Kabushiki Kaisha, Kanagawa, Japan

[21] Appl. No.: 320,863

[22] Filed: Oct. 11, 1994

[30] Foreign Application Priority Data

Oct. 25, 1993 [JP] Japan .................................. 5-266544

[51] Int. Cl.$^6$ .................................................... H01M 4/02
[52] U.S. Cl. ........................... 429/223; 429/218; 429/222; 429/224; 29/623.1; 423/592
[58] Field of Search ........................... 429/59, 101, 223, 429/218, 224, 222; 29/623.1; 420/900; 423/592

[56] References Cited

U.S. PATENT DOCUMENTS 4,330,603  5/1982  Jackovitz et al. .................... 429/206
4,844,999  7/1989  Oshitani et al. ...................... 429/223
5,366,831  11/1994 Watada et al. ........................ 429/223

FOREIGN PATENT DOCUMENTS 0271043  6/1988  European Pat. Off. .
0337029  10/1989 European Pat. Off. .
0353837  2/1990  European Pat. Off. .
0544011  6/1993  European Pat. Off. .

OTHER PUBLICATIONS

Patent Abstracts of Japan, vol. 17, No. 188 (E–1349), 13 Apr. 1993 of JP–A–04 337 246 (Japan Storage Battery Co., Ltd.) 25 Nov. 1992.

*Primary Examiner*—M. Nuzzolillo
*Attorney, Agent, or Firm*—Frishauf, Holtz, Goodman, Langer & Chick, P.C.

[57] ABSTRACT

Provided are a method for preparing a nickel hydroxide for a nickel electrode, which comprises solidly dissolving ions of other metals than nickel in a nickel hydroxide, and eluting a partial amount of the metal, a method for manufacturing a nickel electrode, which comprises filling a porous current collector with an active material paste consisting mainly of the resulting nickel hydroxide, and an alkaline secondary battery which incorporates the nickel electrode as a positive electrode therein. This nickel hydroxide restrains deformation or expansion of the nickel electrode and lowering of the discharge capacity of the battery despite repeated charge/discharge cycles of the battery.

13 Claims, 3 Drawing Sheets

PREPARING METHOD FOR A NICKEL HYDROXIDE FOR A NICKEL ELECTRODE, A MANUFACTURING METHOD FOR THE NICKEL ELECTRODE, AND AN ALKALINE SECONDARY BATTERY INCORPORATING THE NICKEL ELECTRODE THEREIN

BACKGROUND OF THE INVENTION

1. Field of the Invention

The present invention relates to a preparing method for a nickel hydroxide used as an active material for a nickel electrode, operating as a positive electrode in an alkaline secondary battery, a manufacturing method for the nickel electrode using this nickel hydroxide, and an alkaline secondary battery incorporating this nickel electrode as its positive electrode therein. More specifically, the invention relates to a preparing method for a nickel hydroxide adapted for use as an active material for a positive electrode, operating as a positive electrode in an alkaline secondary battery and enjoying satisfactory discharge characteristics and cycle life performance.

2. Prior Art

Recently, nickel-hydride secondary batteries have become the object of public attention as high-capacity alkaline secondary batteries. The batteries of this type act with hydrogen as an active material for a negative electrode, and have negative and positive electrodes arranged in layers with a separator between them. The negative electrode is formed of a current collector and a hydrogen-occlusive alloy which can reversibly occlude and release hydrogen, and which is supported on the current collector, positive electrode is formed of a similar current collector and nickel hydroxide as an active material for a positive electrode, which is supported on the current collector. The negative and positive electrodes constitute an electricity generating element, which is disposed in an alkaline electrolyte, such as potassium hydroxide, and the whole structure is sealed.

A sintered nickel electrode has been the prevailing material for the positive electrode of these batteries. In this nickel electrode, a current collector made of a sintered body of nickel powder is filled with an active material compound which consists mainly of nickel hydroxide which is an active material for a positive electrode. In this case, however, the packing density of the activating material compound is low because the sintered nickel material used as the current collector has a low porosity. Accordingly, this nickel electrode cannot effectively meet the recent demand for higher-capacity alkaline secondary batteries.

Recently, therefore, the following nickel electrode has been developed for use as a positive electrode.

The nickel electrode is formed as follows. A powder of nickel hydroxide, conductive material powder such as nickel powder or cobalt powder, and a binding powder such as polytetrafluoroethylene powder are mixed in predetermined ratios. A given amount of a thickener such as an aqueous solution of carboxymethylcellulose is added to the resulting powder mixture to prepare an active material paste. A current collector with high porosity, e.g., a spongy expanded nickel plate, is filled with the active material paste. Thereafter, the whole resulting structure is dried and pressurized so that the individual powders are bound together by means of the binder and carried in the current collector. Since the current collector used for this nickel electrode has a high porosity, the packing density of the active material compound is high.

If the amount of fill of the active material paste in the current collector is increased a higher-capacity battery results. However, in the case of such a nickel electrode, repeated operation of charge and discharge of the battery which incorporates the nickel electrode is liable to cause deformation of the nickel electrode as a whole, and is liable to cause swelling of the supported active material paste.

In such a situation, the electrical connection between the nickel hydroxide as a active material for a positive electrode and the current collector is worsened, so that the discharge capacity and discharge voltage which can be obtained from the battery are reduced. As the positive electrode (nickel electrode) is deformed or expanded, moreover, the distribution of the electrolyte, having so far been properly balanced between the positive electrode, separator, and negative electrode, is ruined inevitably. The electrolyte contained in the separator, in particular, moves to the positive electrode side, so that its quantity in the separator is reduced. Thus, problems arise such that the internal resistance of the battery increases, and the cycle life characteristic of the battery is shortened.

In order to solve these problems, there has been proposed, in Jpn. Pat. Appln. KOKAI Publication No. 2-30061, for example, a method in which ions of other metals than Ni, such as Zn and Cd, are previously added in the state of solid solution during the manufacture of a nickel hydroxide, and the resulting nickel hydroxide is used as an active material for a positive electrode.

According to this method, deformation or expansion of the nickel electrode during the charge and discharge of the battery can be restrained. On the other hand, however, the discharge capacity of the battery which incorporates the nickel electrode as its positive electrode therein is reduced due to the effect of the added metal ions.

Thus, according to the method described above, the loadings of the metal ions should be limited in order to increase the discharge capacity. In this case, however, the deformation or expansion of the positive electrode cannot be restrained fully effectively. If the metal ion loadings are increased to restrain the deformation or expansion of the positive electrode, on the other hand, then reduction of the discharge capacity of the battery will result.

OBJECTS AND SUMMARY OF THE INVENTION

An object of the present invention is to provide a manufacturing method for a nickel electrode, in which deformation or expansion of a positive electrode during charge/discharge operation can be restrained without lowering the discharge capacity of a battery.

Another object of the invention is to provide a preparing method for a nickel hydroxide adapted for use as an active material for the positive nickel electrode described above.

Still another object of the invention is to provide an alkaline secondary battery incorporating the aforesaid nickel electrode as its positive electrode therein.

In order to achieve the above objects, according to the present invention, there is provided a preparing method for a nickel hydroxide for a nickel electrode, which comprises: a step of preparing a nickel hydroxide containing ions of other metals than nickel solidly dissolved therein; and a step of eluting a partial amount of the metal ions from the nickel hydroxide.

According to the invention, moreover, there is provided a manufacturing method for a nickel electrode, which comprises: a step of preparing a nickel hydroxide containing ions of other metals than nickel solidly dissolved therein and then eluting a partial amount of the metal ions from the nickel hydroxide, thereby preparing a nickel hydroxide to be filled into a current collector; a step of mixing the nickel hydroxide to be filled into a current collector, a conductive material, a binder, and a thickener to prepare an active material paste; and a step of filling the porous current collector with the active material paste, and molding the nickel electrode by heating and pressurization.

According to the invention, moreover, there is provided a manufacturing method for a nickel electrode, which comprises: a step of preparing a nickel hydroxide containing ions of other metals than nickel solidly dissolved therein; a step of mixing the nickel hydroxide, a conductive material, a binder, and a thickener to prepare an active material paste; a step of filling a porous current collector with the active material paste to form a precursor of the nickel electrode; and a step of molding the nickel electrode after eluting a partial amount of the metal ions from the nickel hydroxide of the precursor.

According to the invention, furthermore, there is provided an alkaline secondary battery which incorporates the aforesaid nickel electrode as a positive electrode therein.

DETAILED DESCRIPTION OF THE INVENTION

Figure 1:
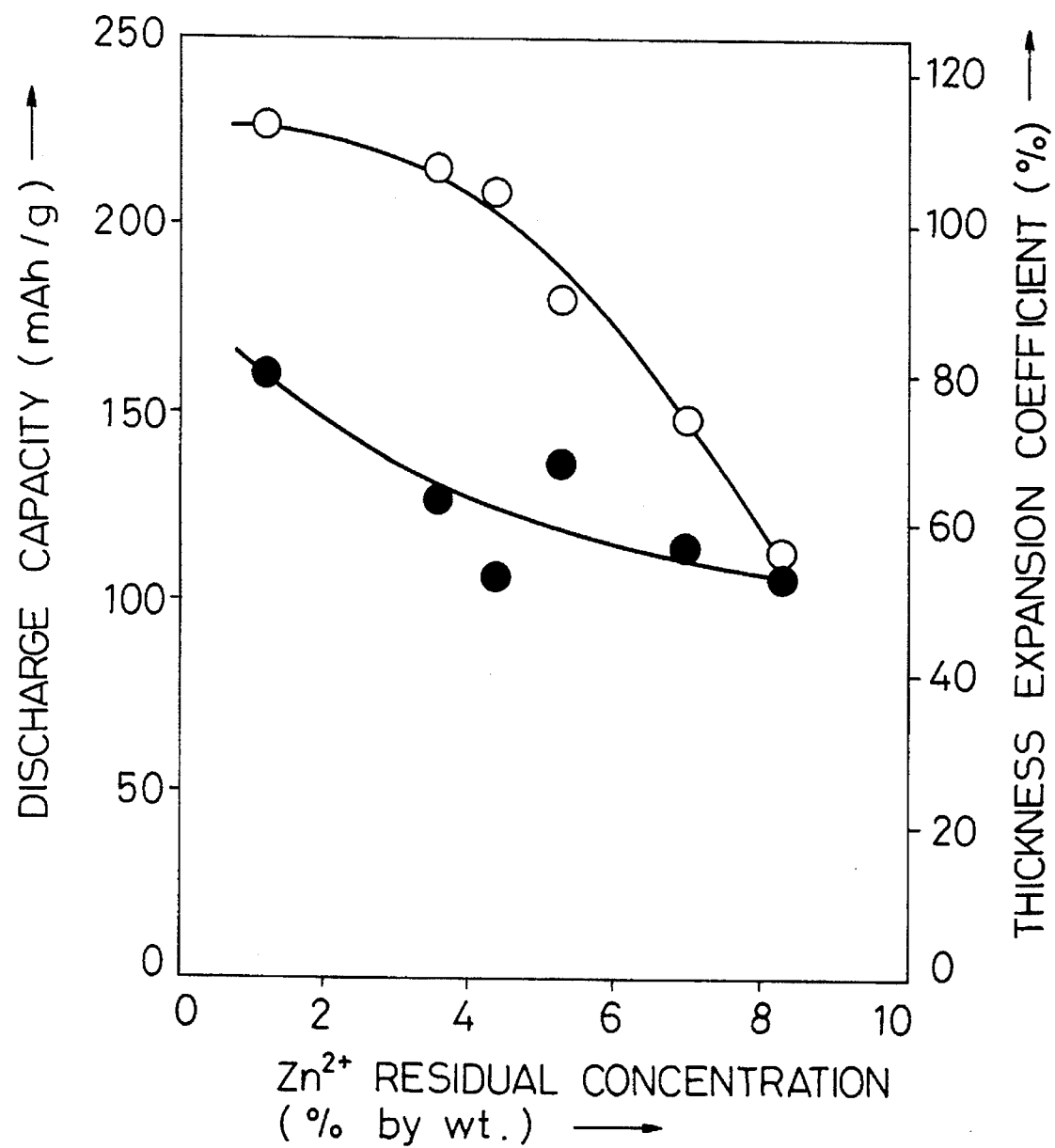
FIG. 1 is a graph showing the relationships between the residual concentration of $Zn^{2+}$ in a nickel hydroxide for a nickel electrode according to the present invention, the thickness expansion coefficient of the nickel electrode, and the discharge capacity of a battery.

In a preparing method for a nickel hydroxide for a nickel electrode according to the present invention, a nickel hydroxide containing metal ions solidly dissolved therein is prepared first. The solidly dissolved metal ions are some other ions than Ni ions, e.g., ions of one or two or more metals selected from a group including Zn, Cd, Mg, Ca, Mn, Co, Cu, and Al.

These metal ions restrain deformation or expansion of a positive electrode during charge/discharge operation.

The nickel hydroxide containing the metal ions solidly dissolved therein is prepared in the following manner. A predetermined amount of nickel salt, such as nickel sulfate, nickel nitrate, nickel chloride, or nickel acetate, and a predetermined amount of a sulfate, chloride, or acetate of one of the aforesaid metals are mixed and dissolved in water, and alkali such as sodium hydroxide is added to the resulting water solution to neutralize it. By this neutralization, the nickel hydroxide is produced and precipitated, and a predetermined amount of the metal ions are dissolved in a solid state in a crystal of sodium hydroxide. At this time, the content of the solid solution of the metal ions in the nickel hydroxide depends on the metal ion concentration of metal salts dissolved together with nickel salt.

The content of the solid solution of the metal ions in the nickel hydroxide is not restricted in particular. If the solid solution content is too high, however, operation (mentioned later) at the time of elution requires unreasonable time and labor. If the content is too low, the effect of restraining deformation or expansion of the positive electrode to be manufactured cannot be enjoyed fully. Usually, it is desirable to dissolve about 3 to 10% by weight of the metal ions as compared with the total amount of the nickel hydroxide to be prepared. The nickel hydroxide containing the metal ions thus dissolved is then subjected to a metal ion elution process, whereupon a partial of amount of the metal ions are eluted.

After the elution, the nickel hydroxide has voids left by the eluted metal ions, and lattice defects in its crystal. These voids and defects serve as cushions when the nickel hydroxide is deformed or expanded during the charge/discharge operation, thereby restraining the deformation or expansion of the nickel electrode. In the elution process, nickel hydroxide prepared in this manner is dispersed in an aqueous solution of alkali, such as potassium hydroxide, sodium hydroxide, or lithium hydroxide, and the whole resulting solution is stirred. If the alkaline aqueous solution is heated to a temperature of about 40° to 110° C., the elution of the metal ions can be accelerated, that is, the operation for the elution can be efficiently carried out in a short time.

Preferably, the elution process should be executed in a manner such that the content of the metal ions remaining in the nickel hydroxide after the process is 5% or less by weight as compared with the total amount of the metal ions. If the residual metal ion content of the nickel hydroxide is 5% or more by weight, the discharge capacity of a battery using this nickel hydroxide is extremely small.

The elution process is not limited to the method described above, and may be a process in which elution of the metal ions solidly dissolved in the nickel hydroxide is accelerated by keeping the nickel hydroxide with the metal ions therein at a suitable potential, in an alkaline electrolyte, such as potassium hydroxide, sodium hydroxide, or lithium hydroxide.

The nickel electrode according to the present invention is manufactured in the following manner.

First, a powder of the nickel hydroxide prepared in the aforementioned manner, a conductive material such as nickel powder, cobalt powder, or cobalt oxide powder, and a binder such as polytetrafluoroethylene powder are mixed in predetermined ratios, and a predetermined amount of a thickener such as an aqueous solution of carboxymethylcellulose is added to the resulting mixture, whereupon an active material paste is obtained. Then, a current collector with a predetermined porosity, e.g., a spongy expanded nickel plate, is filled with the paste, and the paste is dried. The whole resulting structure is molded into a desired shape by heating and pressurization. Alternatively, according to the present invention, a nickel electrode can be manufactured in the following manner. The nickel hydroxide with the metal ions solidly dissolved therein is first prepared, and its powder, conductive material, binder, and thickener are mixed to prepare an active material paste. Then, the current collector is filled with the paste to form a precursor of the nickel electrode. This precursor is subjected to the aforesaid metal ion elution process. Also in this case, a partial amount of the metal ions dissolved in the nickel hydroxide are eluted. After a given amount of the metal ions are allowed to remain, therefore, the whole resulting structure is molded into a nickel electrode of the desired shape by heating and pressurization.

In either of the nickel electrodes manufactured by the methods described above, the nickel hydroxide as the active material is subjected to the aforesaid process. If the nickel electrode is incorporated as a positive electrode in a battery, its deformation or expansion during the charge/discharge operation is small, and at the same time, reduction of the discharge capacity of the battery can be restrained.

An alkaline secondary battery according to the present invention is manufactured by incorporating the above-described nickel electrode as the positive electrode. Even though the charge/discharge operation is repeated, therefore, the nickel electrode cannot be easily deformed or expanded, reduction of the battery capacity is not caused, and the discharge characteristics and cycle life performance are excellent.

EMBODIMENTS 1 TO 8 & COMPARATIVE EXAMPLE 1 TO 10

Nickel hydroxide powders were prepared in which metal ions shown in Table 1 were solidly dissolved at a content of 5% by weight. Ten grams of each of these powders was put into 600 milliliters of a 30% water solution of potassium hydroxide, and was stirred as it was boiled for 6 hours. Thereupon, a nickel hydroxide to be filled into the current collector was obtained. After the treated powders were washed in water and dried, the amounts of the residual metal ions were determined by elemental analysis. Table 1 shows the results of the determination.

Each treated powder, powders of nickel and cobalt oxide (conductive materials), and polytetrafluoroethylene powder (binder) were mixed in the ratios of 40:52:5:3 by weight, and a 1% water solution of carboxymethylcellulose was added to the resulting powder mixture, whereupon an active material paste was obtained.

After a spongy expanded nickel plate with a porosity of 97% was filled with each active material paste, the whole structure was pressed into a electrode plate with a diameter of 20 mm and thickness of 0.6 mm.

Each electrode plate was dipped in a 30% water solution of potassium hydroxide, charge and discharge were effected with use of a current of 50 milliamperes per one gram of the nickel hydroxide in the active material paste filling the nickel plate as a counter electrode, and the discharge capacity was measured. The discharge termination potential used was +0.15 volt as compared with a single-electrode potential of Hg/HgO.

The thickness ($t_0$) of the electrode plate before the start of the charge discharge operation and the electrode plate thickness (t) after 12 charge/discharge cycles were measured, and the thickness expansion coefficient was calculated according to a formula, $100 \times (t-t_0)/t_0$ (%). Table 1 shows the results of these measurements collectively.

For comparison, the same measurements were made on nickel hydroxide materials obtained without the elution process and pure nickel hydroxide without any metal ions dissolved therein. Table 1 also shows the results of these measurements.

TABLE 1

| Items | Metal Ions | Residual Concentration (% by wt.) | Elution Process | Discharge Capacity (mAh/g) | Thickness Expansion Coefficient (%) |
|---|---|---|---|---|---|
| Embodiment 1 | $Zn^{2+}$ | 3.6 | Done | 215 | 63 |
| Embodiment 2 | $Cd^{2+}$ | 3.2 | Done | 222 | 59 |
| Embodiment 3 | $Mg^{2+}$ | 3.7 | Done | 209 | 76 |
| Embodiment 4 | $Ca^{2+}$ | 3.6 | Done | 217 | 74 |
| Embodiment 5 | $Mn^{2+}$ | 3.8 | Done | 227 | 79 |
| Embodiment 6 | $Co^{2+}$ | 3.3 | Done | 227 | 70 |
| Embodiment 7 | $Cu^{2+}$ | 3.2 | Done | 224 | 78 |
| Embodiment 8 | $Al^{3+}$ | 2.9 | Done | 230 | 70 |
| Comparative Example 1 | $Zn^{2+}$ | 5 | Undone | 180 | 85 |
| Comparative Example 2 | $Cd^{2+}$ | 5 | Undone | 169 | 84 |
| Comparative Example 3 | $Mg^{2+}$ | 5 | Undone | 165 | 98 |
| Comparative Example 4 | $Ca^{2+}$ | 5 | Undone | 195 | 102 |
| Comparative Example 5 | $Mn^{2+}$ | 5 | Undone | 193 | 104 |
| Comparative Example 6 | $Co^{2+}$ | 5 | Undone | 197 | 95 |
| Comparative Example 7 | $Cu^{2+}$ | 5 | Undone | 171 | 92 |
| Comparative Example 8 | $Al^{3+}$ | 5 | Undone | 198 | 87 |
| Comparative Example 9 | — | — | Undone | 245 | 116 |
| Comparative Example 10 | — | — | Done | 163 | 119 |

With use of the nickel hydroxide materials according to the embodiments of the present invention, as compared with the case of the pure nickel hydroxide (Comparative Example 9), as seen from Table 1, the thickness expansion coefficient is lower, although the discharge capacity is a little smaller. As is evident from the comparison between Comparative Examples 9 and 10, moreover, the discharge capacity is much smaller than in the cases of the embodiments if the pure nickel hydroxide is only boiled in the water solution of potassium hydroxide. This indicates the same effectiveness of the metal ion elution process as in the embodiments.

EMBODIMENT 9

The boiling time for Embodiments 1 was changed for nickel hydroxide materials containing 10% by weight of $Zn^{2+}$ dissolved therein, whereupon various nickel hydroxide materials with different residual $Zn^{2+}$ concentrations were obtained.

Electrode plates similar to the ones according to Embodiments 1 to 8 were molded by using these nickel hydroxide materials, and the discharge capacity and thickness expansion coefficient were measured with use of these electrode plates in the same manner as in Embodiment 1.

The measurement results are illustrated in FIG. 1 which shows the relationships with the residual $Zn^{2+}$ concentration. In FIG. 1, white and black circles represent the discharge capacity and the thickness expansion coefficient, respectively.

If the residual $Zn^{2+}$ concentration exceeds 5%, as seen from FIG. 1, the thickness expansion coefficient decreases gradually, while the discharge capacity of the battery lowers suddenly. It is advisable, therefore, to restrict the residual content of $Zn^{2+}$ in the nickel hydroxide to 5% or less by weight.

EMBODIMENT 10 & COMPARATIVE EXAMPLES 11 & 12

Nickel hydroxide powders were prepared containing 5% by weight of $Zn^{2+}$ solidly dissolved therein. One hundred grams of each of these powders was put into 5 liters of a 30% water solution of potassium hydroxide, and was stirred as it was boiled for 10 hours. The residual $Zn^{2+}$ concentration was 3.1% by weight.

Each of these powders, powders of nickel and cobalt oxide (conductive materials), and polytetrafluoroethylene powder (binder) were mixed in the ratios of 90:5:5 by weight, and a 1% water solution of carboxymethylcellulose was added to the resulting powder mixture, whereupon an active material paste was obtained.

After a spongy expanded nickel plate with a porosity of 97% was filled with each active material paste, the whole structure was pressed into a positive electrode.

Figure 3:
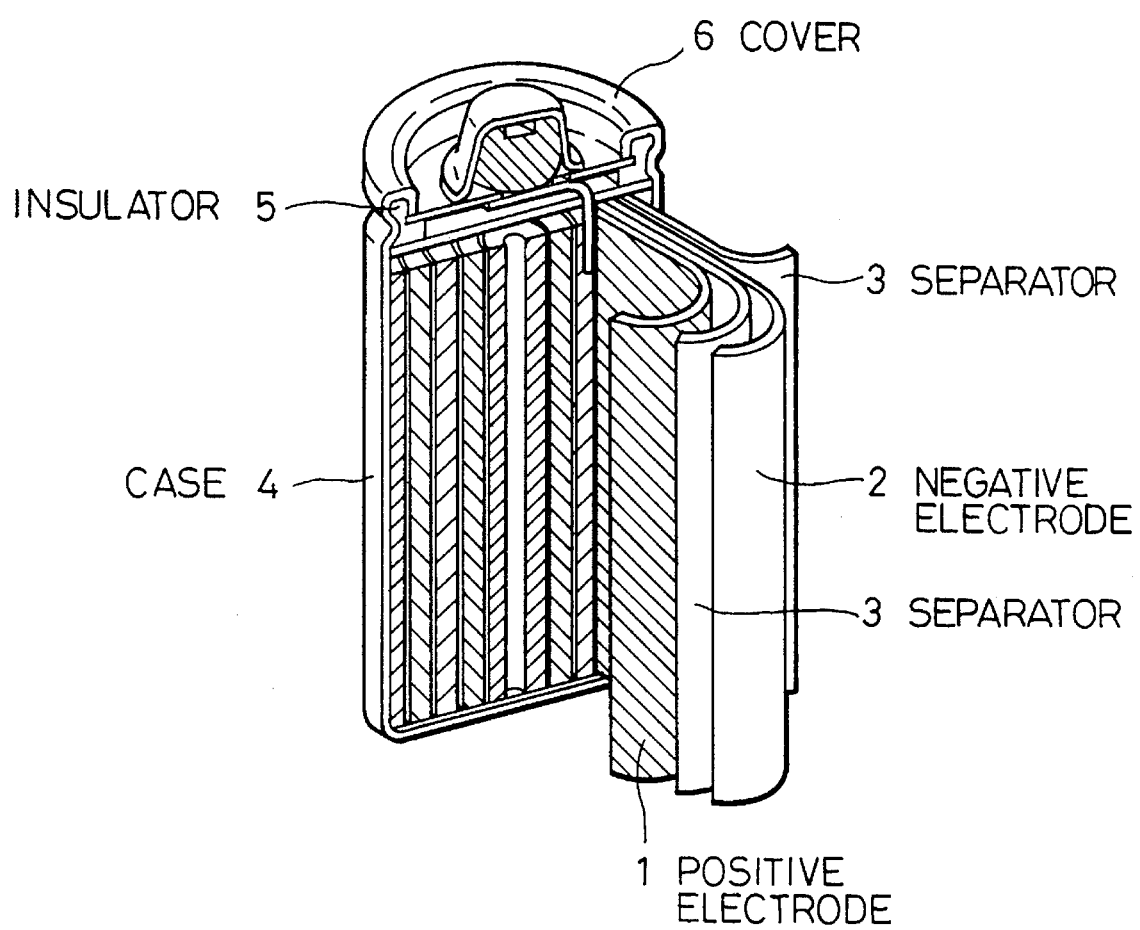
FIG. 3 is a cutaway perspective view of an alkaline secondary battery incorporating the nickel electrode of the present invention as a positive electrode.

Then, as shown in FIG. 3, an AA-size alkaline secondary battery with a rated capacity of 1,100 mAh was assembled by using this positive electrode, as follows: First, a nylon sheet as a separator 3 was interposed between the positive electrode 1 and a negative electrode 2 on which a hydrogen-occlusive alloy was supported, and the entire structure was rolled and then contained in a case 4 made of stainless steel plated with nickel. A water solution of potassium hydroxide was poured into the case 4 as an electrolyte, and the case 4 was hermetically sealed by a cover 5 with an insulator 5 therebetween.

For comparison, a similar positive electrode was manufactured with use of a nickel hydroxide powder obtained without the elution process and pure nickel hydroxide, and a similar battery was assembled by using this positive electrode.

Moreover, a similar battery was assembled by using pure nickel hydroxide as an active material as a positive electrode.

These three types of alkaline secondary batteries were subjected to charge/discharge cycle test under conditions including a current of 1,100 milliamperes, charging time of 1.2 hours, discharge termination voltage of 1.00 volt.

Figure 2:
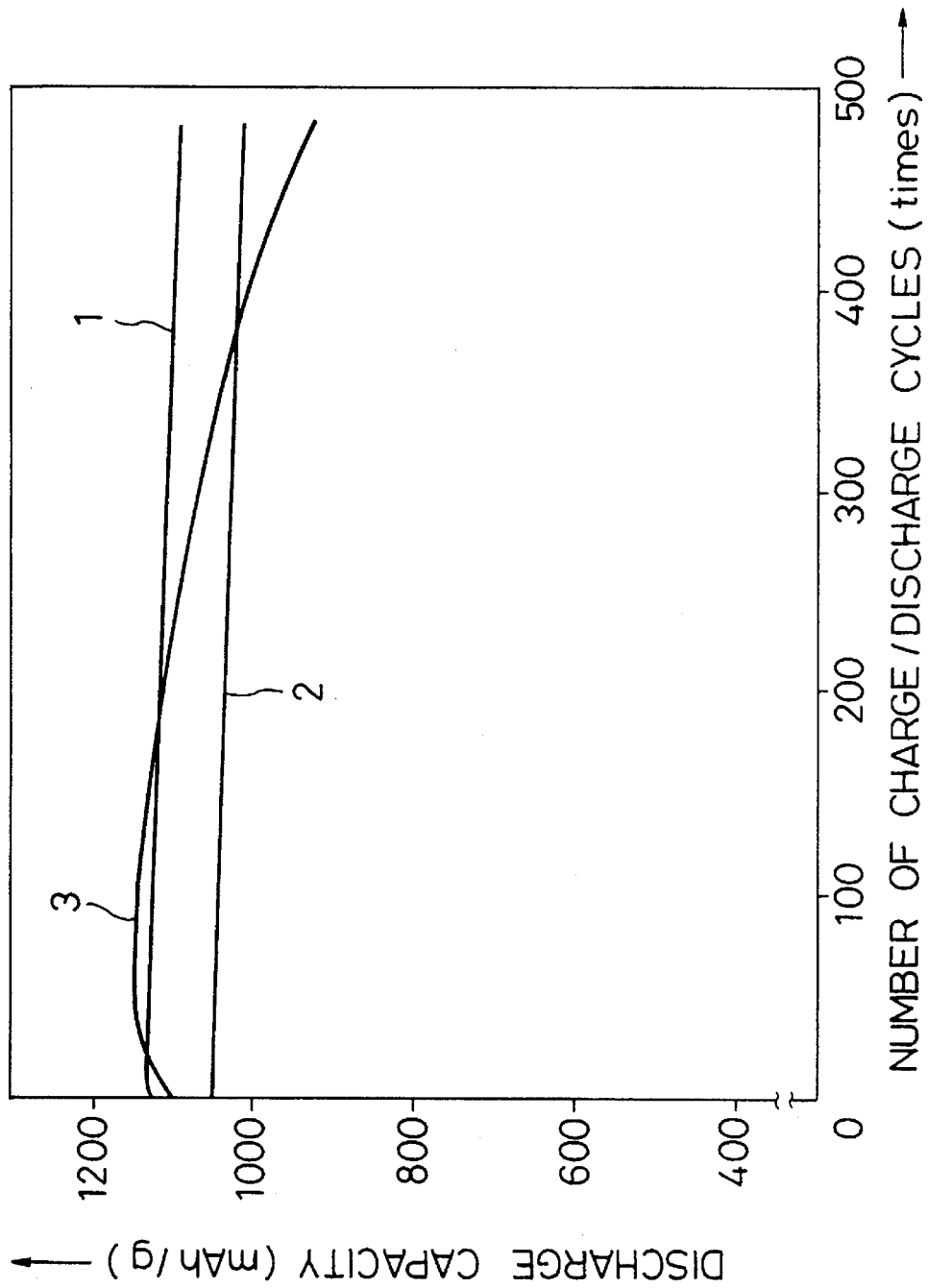
FIG. 2 is a graph showing the relationships between the number of charge/discharge cycles and the discharge capacity.

The test results are illustrated in FIG. 2 which shows the relationships between the number of charge/discharge cycles and the discharge capacity.

In FIG. 2, curves 1, 2 and 3 represent cases where the nickel hydroxide material subjected to the elution process was used, where the nickel hydroxide material obtained without the elution process was used, and where pure nickel hydroxide was used, respectively.

As seen from FIG. 2, the battery using the nickel hydroxide according to the present invention can maintain a high discharge capacity for a long period of time.

What is claimed is:

1. A method for preparing nickel hydroxide for a nickel electrode, comprising:

preparing nickel hydroxide containing metal ions, other than nickel, solidly dissolved therein; and eluting a partial amount of said metal ions from said nickel hydroxide to reduce the total amount of said metal ions in said nickel hydroxide.

2. A method according to claim 1, wherein said metal ions are ions of at least one metal selected from the group consisting of Zn, Cd, Mg, Ca, Mn, Co, Cu, and Al.

3. A method according to claim 1, wherein said elution process is carried out using an alkaline aqueous solution.

4. A method according to claim 1 or 3, wherein the weight of the metal ions remaining in the nickel hydroxide after the elution process is 5% or less of the weight of said nickel hydroxide.

5. A method for manufacturing a nickel electrode, comprising:

preparing nickel hydroxide containing metal ions, other than nickel, solidly dissolved therein and then eluting a partial amount of the metal ions from the nickel hydroxide, thereby preparing a nickel hydroxide to be filled into a current collector;

mixing said nickel hydroxide to be filled into a current collector, a conductive material, a binder, and a thickener, to prepare an active material paste; and filling the porous current collector with the active material paste, and molding the nickel electrode by heating and pressurization.

6. A method for manufacturing a nickel electrode, comprising:

preparing nickel hydroxide containing metal ions, other than nickel, solidly dissolved therein;

mixing said nickel hydroxide, a conductive material, a binder, and a thickener to prepare an active material paste;

filling a porous current collector with said active material paste to form a precursor of the nickel electrode;

eluting a partial amount of the metal ions from the nickel hydroxide of the precursor; and molding the nickel electrode by heating and pressurization.

7. A method according to claim 5 or 6, wherein said conductive material is a material selected from the group consisting of nickel powder, cobalt powder, and cobalt oxide powder.

8. A method according to claim 5 or 6, wherein said binder is polytetrafluoroethylene powder.

9. A method according to claim 5 or 6, wherein said thickener is a water solution of carboxymethylcellulose.

10. A method according to claim 5 or 6, wherein said current collector is spongy expanded nickel.

11. An alkaline secondary battery comprising the nickel electrode manufactured by the method according to claim 5 or 6 as a positive electrode.

12. The method according to claims 5 or 6 wherein said metal ions are ions of at least one metal selected from the group consisting of Zn, Cd, Mg, Ca, Mn, Co, Cu, and Al.

13. A method according to claim 12, wherein said binder is polytetrafluoroethylene powder;

said thickener is a water solution of carboxymethylcellulose;

said current collector is spongy expanded nickel; and said conductive material is a material selected from the group consisting of nickel powder, cobalt powder, and cobalt oxide powder.

* * * * *